United States Patent
Chiu et al.

[11] Patent Number: 5,940,373
[45] Date of Patent: Aug. 17, 1999

[54] FRAME RELAY NETWORK PLANNING TOOL

[75] Inventors: Steve Y. Chiu; Subramanian Raghavan; Ronald L. Hansen, all of Louisville; Jiyang Xu, Superior, all of Colo.

[73] Assignees: U S West, Inc., Denver; MediaOne Group, Inc., Englewood, both of Colo.

[21] Appl. No.: 08/785,805
[22] Filed: Jan. 14, 1997
[51] Int. Cl.[6] ........................................... H04J 11/00
[52] U.S. Cl. ........................ 370/238; 370/254; 370/252; 379/220
[58] Field of Search ............................ 370/238, 254, 370/255, 252, 450, 351, 355, 389, 253; 395/250.69, 250.7, 250.71; 379/220, 221

[56] References Cited

U.S. PATENT DOCUMENTS

| | | | |
|---|---|---|---|
| 4,669,113 | 5/1987 | Ash et al. | 379/221 |
| 5,067,148 | 11/1991 | Sardana | 379/111 |
| 5,270,919 | 12/1993 | Blake et al. | 340/827 |
| 5,274,643 | 12/1993 | Fisk | 370/94.1 |
| 5,412,647 | 5/1995 | Giroux et al. | 370/232 |
| 5,748,617 | 5/1998 | McLain, Jr. et al. | 370/244 |
| 5,764,740 | 6/1998 | Holender | 379/112 |

*Primary Examiner*—Jeffery A. Hofsass
*Assistant Examiner*—Ashok Mannava
*Attorney, Agent, or Firm*—Brooks & Kushman, P.C.

[57] ABSTRACT

A frame relay network planning tool is provided for analyzing the status of an existing network, for evaluating the condition of any user defined configuration, and for optimizing the expansion of the network based on demand and costs. The tool recommends the optimal locations of new switches, the configurations of existing switches and the placement of new trunks, and backhaul locations where desirable. The tool attempts to optimize the network configuration for the given demand by a sequence of network configuration changes. After each change, an attempt is made to route the demand, with minimal cost, until all demand is routed. The network changes made by the program include in order of priority, upgrading a link, adding a link, upgrading a switch, and adding a switch. When this process is completed a survivability test is run to insure that the network configured by the tool is survivable.

16 Claims, 6 Drawing Sheets

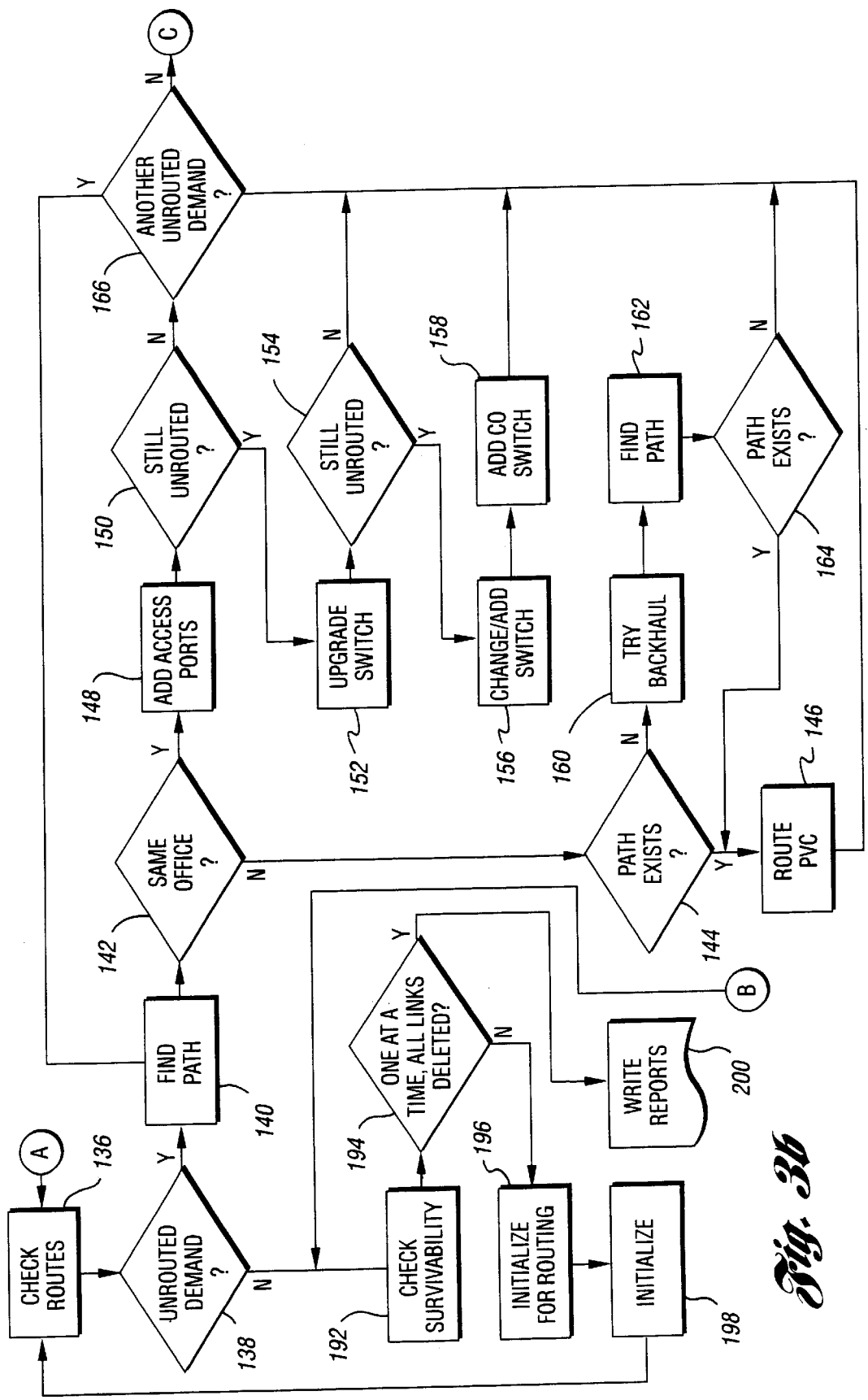

FRAME RELAY NETWORK PLANNING TOOL

TECHNICAL FIELD

This invention relates to network tools and more particularly to a tool for assisting in the planning and managing of networks such as frame relay or similar type network.

BACKGROUND ART

Frame Relay (FR) is a high speed connection-oriented data transfer service. It utilizes permanent virtual connections (PVC's) to establish logical connections between customer locations to provide higher access speeds and less delay than traditional packet-switched technologies. Frame relay networks are complex and expensive. It is important to design frame relay networks that are cost-effective, reliable and have sufficient capacity to meet current and expected customer demand. Considering the extremely rapid growth in demand for frame relay service, it is important that adequate capacity be provided while ensuring economical use of capital resources. Indeed, one of the most pressing problems with the frame relay network stems from rapid growth and the lack of network planning tools. Consequently, the majority of the engineering is done on a reactive rather than a proactive basis. The solution to the problem is more complex than merely adding a trunk or trunks to the network path. Accordingly, a network planning tool is needed to assist the engineer in planning and growing a network in a methodical fashion.

DISCLOSURE OF THE INVENTION

In accordance with the present invention a network planning tool is provided for analyzing the status of the current network, for evaluating the condition of any user defined configuration, and for optimizing the expansion of the network based on demand and costs. The solution recommended by the tool of the present invention will ensure that the network is cost effective, reliable, and has sufficient capacity to meet current an expected customer demand. More particularly, the network planning tool of the present invention optimizes the frame relay network based on customer demand, equipment cost, and the existing network configuration. The tool recommends the optimal locations of new switches and backhaul locations where the user has determined they might be allowed. The tool also recommends the configurations of existing switches (e.g. how many access cards to add), and the placement of new trunks. The tool includes a graphical user interface that allows the user to easily input required data, perform network optimization and what-if analysis, and display the results through menus, tables, and graphical displays. The tool can interface with existing database systems to obtain current network data directly without user entry.

The PVC routing optimization problem can be solved as an integer linear programming problem given below:

Let
  N=the set of central office (CO) locations.
  V=the set of all frame relay switches.
  $V_n$=the set of switches in central office n∈N.
  E=the set of links between switches.
  W=the set of all central office pairs.
  $P_w$=the set of paths connecting a switch in $n_1$ and a switch in $n_2$, w=($n_1$,$n_2$).
  O(p)=the first switch on path p.
  D(p)=the last switch on path p.
  S=the set of PVC types.
  $a_v$=the access capacity of switch v.
  $b_e$=the bandwidth capacity of link e.
  $c_v$=the processing capacity of switch v.
  $d_{w,s}$=the PVC demand of type s between office pair w.
  $r_s$=the CIR of type s PVC.
  $x_{ps}$=an integer variable indicating the number of type s PVCs to be routed on path p.

Maximize
$$\sum_{w \in W} \sum_{p \in P_w} \sum_{s \in S} x_{ps}$$

Subject to
$$\sum_{p \in P_w} x_{ps} \le d_{ws} \quad w \in W, s \in S$$

$$\sum_{s \in SO(p) or D(p)=v} r_s x_{ps} \le a_v \quad v \in V$$

$$\sum_{s \in S} \sum_{p \ni v} r_s x_{ps} \le c_v \quad v \in V$$

$$\sum_{s \in S} \sum_{p \ni e} r_s x_{ps} \le b_e \quad e \in E$$

$x_{ps}$ integers

However, a computer programmed to solve this problem would require an unacceptably long time to produce an optimized result. The present invention provides a network planning tool using a heuristic approach that attempts to route a path for a given demand in a reasonable time. The tool attempts to optimize the network configuration for the given demand by a sequence of network configuration changes. After each change, an attempt is made to route the demand, with minimal cost, until all demand is routed. The network changes made by the program include in order of priority, upgrading a link, adding a link, upgrading a switch, and adding a switch. When this process is completed a survivability test is run to insure that the network configured by the tool, is a survivable network.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
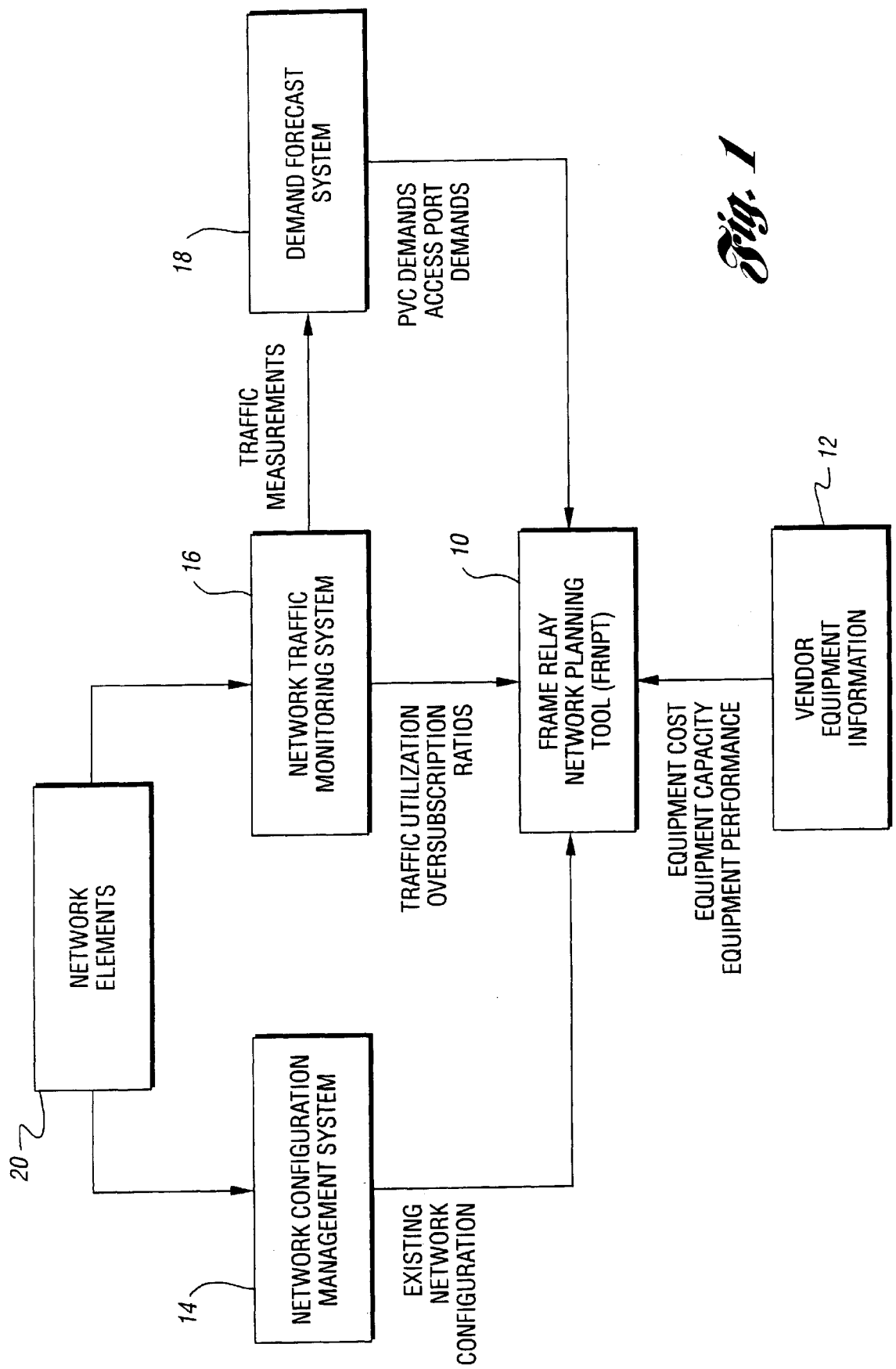
FIG. 1 is an overall block diagram of the planning tool of the invention.

Referring now to the drawings, and initially to FIG. 1, a block diagram of the network planning process is shown. The frame relay network planning tool is generally designated 10, and receives input data 12 that includes vendor equipment information such as equipment cost, capacity and performance. Other input data includes the existing network configuration from a network configuration management system 14, traffic utilization oversubscription ratios from a network traffic monitoring system 16, and PVC and access port demands from a demand forecast system 18. The systems 14 and 16 manage and monitor network elements generally indicated at 20 and the system 16 provides traffic measurements to the system 18.

Figure 2A:
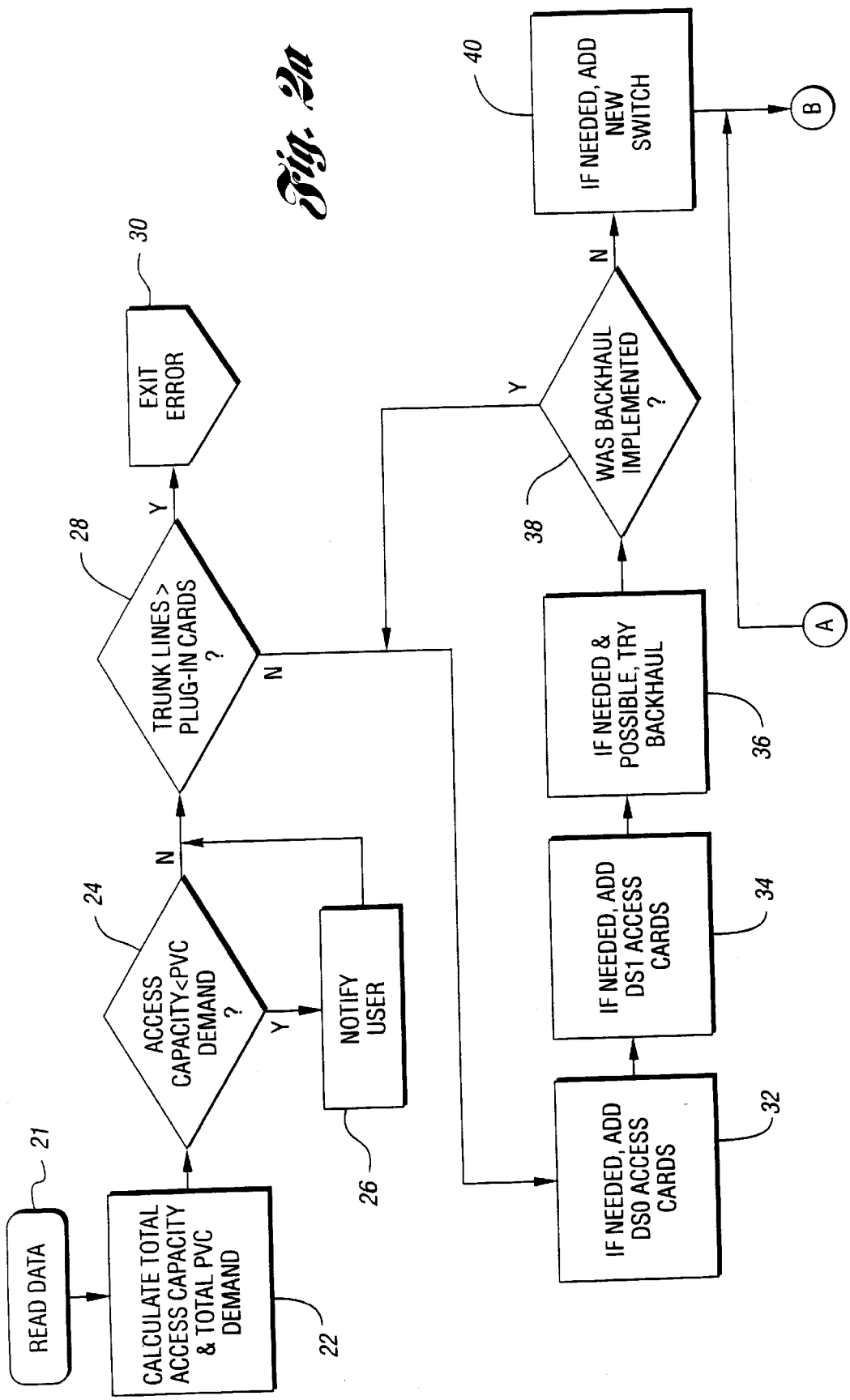
FIG. 2 is a flowchart showing the operation of a preferred embodiment of the invention.
Figure 2B:
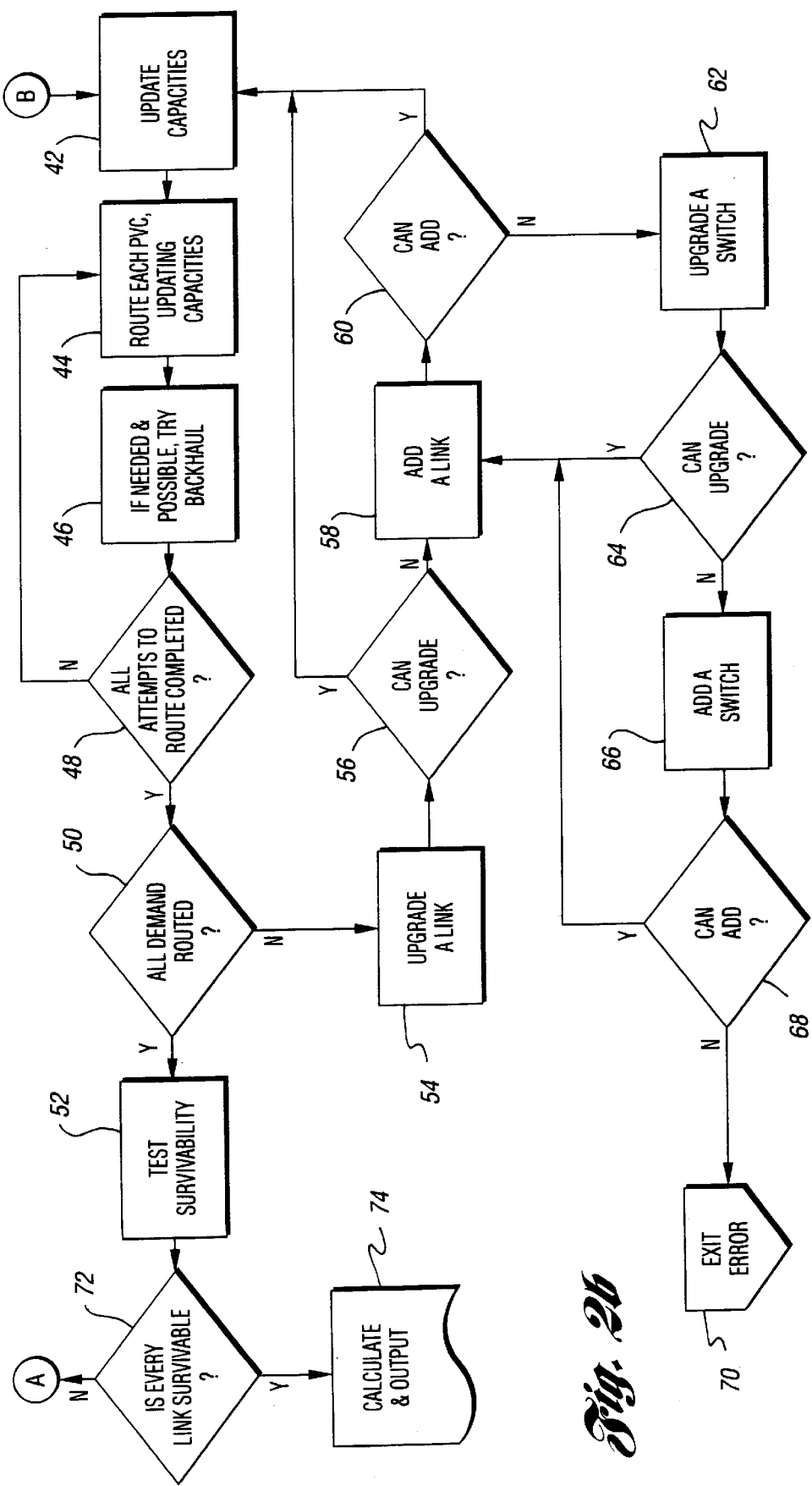

A flowchart of the program running on the tool is shown in simplified form in FIG. 2. At block 21, data regarding the current network configuration are input to computer memory forming data structures for keeping track of the network as it is upgraded or modified to reflect changes to meet demand. The data input include:

1. Existing switch capacities (Access—DS0, DS1 & Trunk DS1, DS3)
2. Existing link capacities DS1, DS3)
3. Existing backhaul capacities (From/To locations & DS0, DS1)

Also at block 21, cost data are input for:

1. Switches and various components
2. Links (DS0, DS1 & DS3)

Also input at block 21 are:

1. Allowed switch configurations (Maximum access & trunk capacities)
2. Inter-vendor line rates
3. Over-subscription ratios Finally, demand data are input for:

1. Access ports
2. PVCs

During input, data are checked for data consistency at block 22. At least two COs and one PVC must be input, else the program is halted. Also, at block 22, the total access capacity and total PVC demand are calculated for each central office in the network, based on input data. For each Central Office (CO) location i, let:

$D_i$=the total originating and terminating PVC demand in Kbps, and let:

$A_i$=the total access capacity requested at $CO_i$, where $A_i$=DS0_access_port_demand×DS0_line_rate×DS0_access_oversubscription_ratio+DS1_access_port_demand×DS1_line_rate×DS1_access_over-subscription_ratio.

If $A_i<D_i$, as determined in decision block 24, then the user is notified at block 26. The program will automatically increase the number of access ports required and continue. Within each switch, the number of connected existing (or planned) trunks of any given type should be less than or equal to the number of existing (or planned) plug-in cards of that same type. If the number of trunk lines of any one type is greater than the number of plug-in trunk cards of that same type, as determined at block 28, then an error is reported at 30 and the program is terminated For each CO, if the number of DS0 or DS1 access ports requested is greater than the number of DS0 or DS1 access cards existing or planned, the computer data structure is modified at 32 and 34 to add DS0 or DS1 access cards to the empty DS0 or DS1 switch ports in the existing or planned switches in that CO.

If there are still unsatisfied DS0 or DS1 access port demands at a CO, a determination is made at block 36 whether the unsatisfied demand can be backhauled to another specified CO. If backhauling is possible (as determined by user input) and. implemented as determined at decision block 38, the computer data structures are modified to add capacity on the backhaul link, and add the demands to the backhaul destination CO. Steps 32–36 are performed for the backhaul destination CO.

If at block 38, the unsatisfied demands at a CO cannot be backhauled, then as indicated at block 40 new switches and access cards are added to the computer data structure to cover the demands. In each instance the switch type that will minimize the cost is picked from the available switches At block 42, the access capacity and CPU processing capacity of each switch are calculated and updated. Also, the bandwidth capacity of each trunk group is calculated and updated.

In block 44 the PVC demands are routed sequentially by:

a.) identifying a shortest (least trunk cost) path that has enough capacity to route the PVC;
b.) routing the PVC on that path;
c.) updating the unused access capacity for the originating and terminating switches;
d.) updating the unused bandwidth capacity for the links along the path; and
e.) updating the unused processing capacity for the switches on the path.

If such a path cannot be found, then at block 46 an attempt is made to backhaul the origin or the destination or both origin and destination of the PVC to a user specified location. Blocks 44 and 46 are executed until an attempt has been made to route all input demand as determined at block 48. If all PVC demands are routed successfully, as determined at block 50, then a survivability test is initiated at block 52.

If at block 50, all demands have not been successfully routed, then at block 54 trunk capacity is added by tentatively routing all unsatisfied demands on the shortest paths regardless of capacity considerations. The link that has the largest amount of overflow is identified and the capacity of that link is upgraded in the computer data structure by replacing a DS1 trunk by a DS3 trunk, or by adding a new DS1 trunk, or by adding a new DS3 trunk. If the link cannot be upgraded, then an attempt is made to upgrade the link with the second largest amount of overflow. This process is continued in this fashion in block 54 until a link can be upgraded as determined at block 56 and then the program continues at blocks 42–50.

If no existing link can be upgraded, then the computer data structure is modified by adding a new link with a DS1 or DS3 trunk according to the unrouted demand pattern, as indicated at block 58. A candidate new link is selected between two COs based on the maximal ratio of:

$$\frac{\text{Total originating and terminating demand}}{\text{Cost of new link}}.$$

Precedence is given to a link that actually connects two demand pairs. If a link can be added then the program continues at blocks 42–50. If no new link can be added as determined at block 60, then a switch that is exhausted or has overflowed links is identified for upgrade at block 62. If upgrade is possible as determined at block 64 then program flow returns to block 58 until new trunks can be added.

If no new switch can be upgraded or no trunk can be added, then at block 66, the total amount of unsatisfied demand for each CO is calculated in two ways. First, along the shortest path, the total switch overflow within the CO is calculated. Second, total unrouted demand originating and terminating at the CO is calculated. A new switch is installed at. the CO that has the largest amount of unsatisfied demand, using the first calculation and then, if still needed, the second calculation. If a switch can be added as determined in block 68, program flow returns to block 58. Otherwise, the program exits and reports an error, as indicated at 70, that the network cannot be designed to meet input parameters.

As indicated above if and when all demand is met, a survivability test is initiated at block 52. The test involves initiating a failure of each trunk type for each link and rerouting all PVC demands, using over subscription ratios specified in the input data for failure conditions. If necessary the computer data structure is modified to add more network capacities in accordance with blocks 42–68 until every link is survivable as determined by block 72.

At block 74 the final results are calculated and output. This includes:

a.) New switch and trunk placement and the number of new plug-in cards installed in each switch, b.) New backhaul locations and the number of new trunks added at each backhaul location, c.) The total cost for each switch, each trunk group, and each backhaul link, and d.) The expected utilization of each switch, each trunk group, and each backhaul link.

Figure 3A:
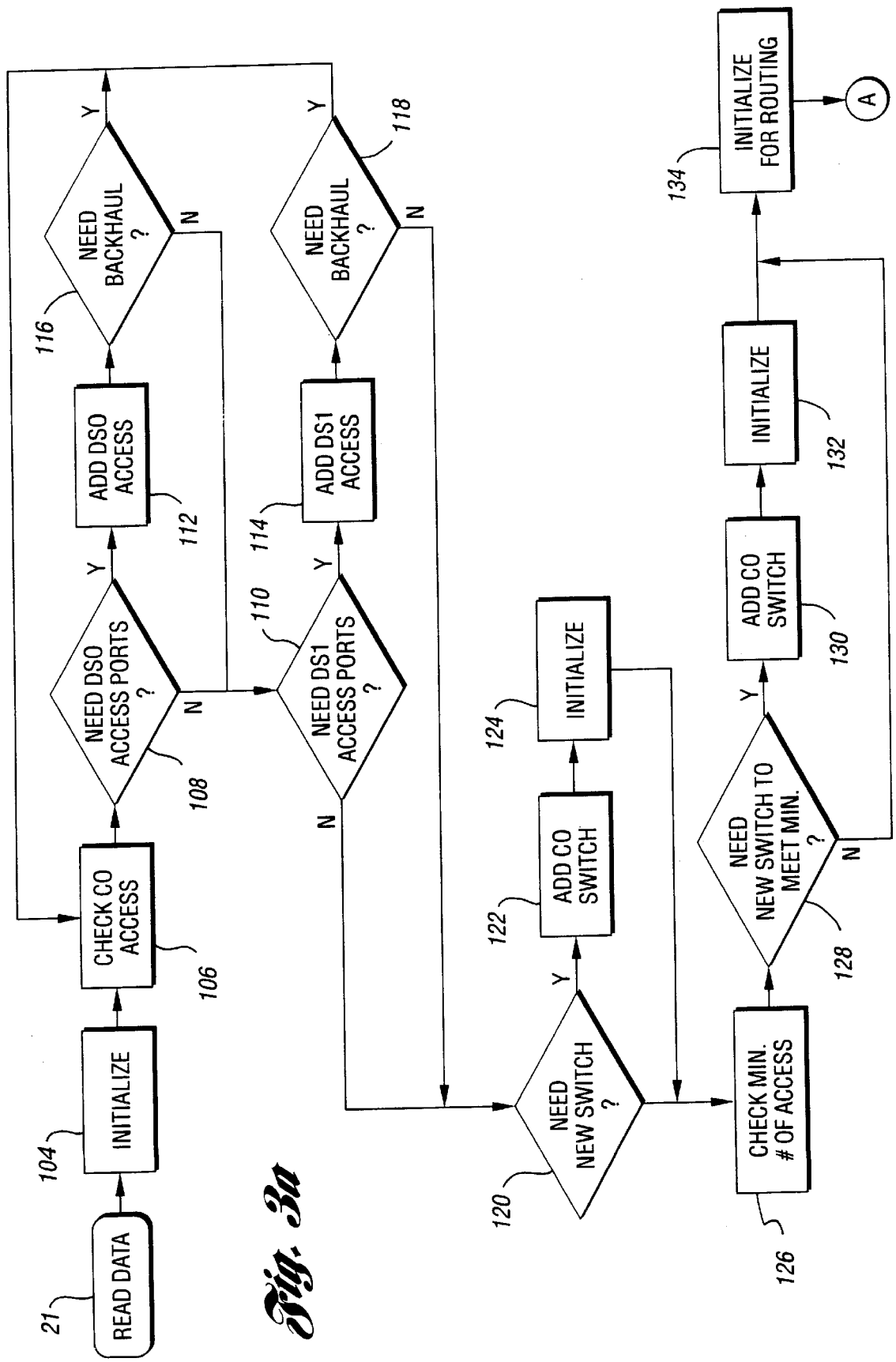
FIG. 3 is a more detailed flowchart of the preferred embodiment of the invention.
Figure 3C:
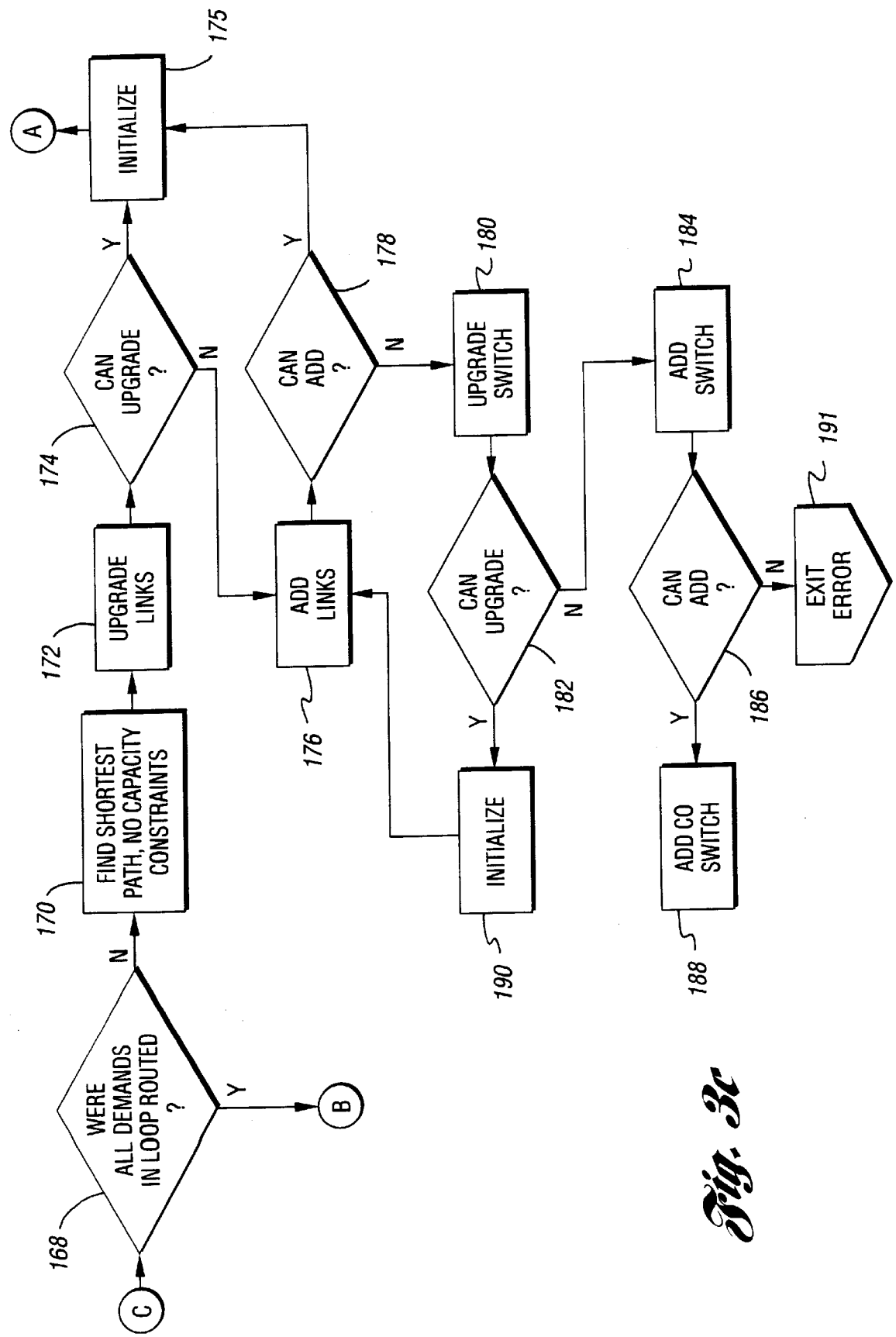

Referring now to FIG. 3, a more detailed flow chart is depicted. For each switch identified in the input data, the sum of DS1 & DS3 PVC demands originating or terminating at that switch is calculated, at block 104. If the total PVC demand for a given switch is greater than the number of trunk ports for that same switch, the program is halted. Otherwise, at block 106, the access port demand (DS0 & DS1 separately) is calculated for each CO. If the demand is greater than the total switch capacity at a given CO, the appropriate access capacities are increased to meet the demand. If DS0 or DS1 access is needed as determined at decision blocks 108 and 110, then the required access port cards are added, as indicated at 112 and 114, to the deficient switch(es), up to their maximum configuration. If access port demand is still not satisfied as determined at decision blocks 116 and 118, the program will backhaul, if the given CO is allowed to backhaul (as indicated by the input data), by moving the amount of the unsatisfied access port demand to the other CO (the "to" location). If the "to" location CO has already had its access ports checked at block 106, it is rechecked with the additional backhauled demand.

At block 120 a decision is made as to whether access port demand is greater than switch capacity. If so, a switch (from the list of available switch types indicated in the input data), that possesses the capacity to accommodate the unsatisfied access port demand is added to the CO, as indicated at block 122 and initialized, as indicated, at block 124. Throughout the program the data structures are initialized whenever equipment is added or upgraded to verify that the integrity of the network is still valid and routing may proceed.

At block 126, the minimum amount of access of each CO is calculated. At block 128, a determination is made for each CO, whether there is PVC demand originating and/or terminating at that CO and whether a switch exists in that CO. If not, a switch is added at block 130 that has enough access capacity to handle the PVC demand and the switch is initialized at 132.

Regardless of whether a new switch is added, block 134 initializes each switch for routing. This is done by verifying that for each switch, the "requested" number of port cards (as determined by the access and PVC demands) is less than that switch's maximum configuration. Otherwise, the program is halted. Also, at block 134 the maximum access capacity and maximum CPU capacity, of each switch, is calculated using the appropriate over-subscription ratio provided as input. For each link, the maximum carrying capacity is calculated using the appropriate input over-subscription ratio, taking into account whether the two switches at the endpoints of the given link are from the same vendor. For each backhaul, the maximum carrying capacity is calculated using the appropriate input over-subscription ratio.

At block 136, the routes are checked to find the shortest distance path between the originating and terminating CO that has enough capacity to satisfy the demand. For each PVC demand, as much of the given demand is routed to the terminating CO as is possible, given the capacity along the entire path. Blocks 140–166 form a loop by which all of the demands are checked to find if a path with enough capacity exists. If path(s) cannot be found to accommodate all of the PVC demand, the unsatisfied or unrouted demand is compiled in a "list" for further action.

At blocks 140 and 142, a determination is made whether the originating and terminating COs are the same, and if so whether any switch within the given CO can satisfy the PVC demand. As indicated in blocks 144 and 146, if there are two distinct COs, the shortest distance path between them that has enough capacity to satisfy the demand, is found, if one exists.

If the originating and terminating COs are the same and the demand cannot be satisfied, the necessary access port cards are added at block 148, up to the given switches' maximum configuration. If the demand is still not satisfied as determined at block 150, the switch is upgraded at block 152 to a different model (or vendor) that can accommodate all of the demand (both that which is already accounted for and the new unsatisfied demand). If the demand is still not satisfied, a determination is made at block. 154 whether DS0 or DS1 ports are required and if so, a new switch is added as indicated at block 156. At block 158 the variables in the data structures are upgraded.

Where the originating and terminating CO's are different, and a path does not exist for satisfying the demand, as determined at block 144, a check is made at block 160, to determine if either (or both) CO(s) is (are) allowed to be backhauled (as indicated in the input data). If such is the case, and the backhaul link can accommodate the demand, the appropriate amount of the PVC demand is moved to the new CO(s) (at the other end of the allowed backhaul). If a backhaul is permitted as determined by blocks 162 and 164, the necessary backhaul carrying capacity is subtracted from the utilized backhaul link and the PVC is routed at block 146 along the path constructed, while subtracting the necessary access, cpu and link carrying capacities.

Block 166 checks to see if there is another unrouted demand within the original loop. If so, blocks 140–166 are executed for this next demand. This process continues until all demands in the loop are checked. At block 168, if the "list" created by looping through all of the previously unrouted demands contains still unrouted demands (i.e. the demand could not be routed by the blocks 140–166), then the shortest distance path is determined in block 170 without regard to whether the path has the capacity to handle the demand.

At block 172, for all remaining unrouted demands, the link along the shortest paths that has the greatest amount of capacity overflow is determined. If at least one exhausted link exists, an attempt is made, in the following order, to upgrade a DS1 to a DS3, add a DS1 trunk or add a DS3 trunk. If any attempt succeeds, as determined at block 174, the link is initialized at block 175 and program execution branches back to block 136 where the unrouted demands are attempted to be routed utilizing the new equipment. If a given link cannot be upgraded, the link with the next largest amount of overflow is examined to determine if it can be upgraded.

If upgrading links still leaves unrouted demand as determined by block 174, the total PVC demand for COs at the endpoints of the unrouted demands is determined. For all possible pair combinations of such COs, the cost of adding a link with the required capacity between the two given COs is calculated at block 176. This necessitates evaluating the capacity of existing switches in each Co and whether new port cards must be added (the cost of the new cards is added into the cost of the new link. After the cost is calculated, the ratio $$\frac{\text{Total originating and terminating demand}}{\text{Cost of new link}}.$$

is determined. This ratio is biased in favor of links that connect two COs that actually have a demand pair between them. The new link is added at block 178 and, if necessary, any new switch port cards are added. The links are then initialized at block 175 and the program execution branches to block 136 where an attempt is made to route the unrouted demands utilizing the new equipment.

If unrouted demand still exists, a search is made, at block 180, along the shortest path to locate the switch that has the greatest amount of capacity overflow. If there exists at least one exhausted switch, an attempt is made to upgrade this switch to a new model or new vendor, insuring that the new switch has at least the capacity of the old switch and adds additional trunk port capacity to handle the overflow. If a suitable switch is found, as determined by the block 182, it is initialized at block 190 and the block 176 is reentered to add new links if necessary and if possible. If the located switch cannot be upgraded, the switch with the next largest amount of overflow is located for possible upgrading.

If unrouted demand still exists, a search is made, at block 184, along the shortest path to locate the CO that has the greatest amount of capacity overflow. In addition, the CO at which the greatest amount of unrouted demand originates and/or terminates is identified. If there exists at least one CO with exhausted switch capacity, as determined at block 186, a switch that can handle the overflow is added at block 188 and the switch is initialized at block 190 and the block 176 is reentered to add new links if necessary and if possible. If unrouted demand still exists, a new switch is added at block 188 to the CO with the next largest amount of switch overflow and the program returns to blocks 190 and 176 to add new links if necessary and if possible. If unrouted demand still exists, a new switch is added at block 188 to the CO at which the greatest amount of unrouted demand originates and/or terminates and the program returns to block 190. If there is no exhausted switch capacity at any of the CO's, as determined at block 186, the program is halted, as indicated at 191.

Once all demands have been routed (blocks 136–190) program execution branches to block 192 from the decision block 168 to perform a survivability test. At block 194, a failure is initiated at each link in the network to check for survivability. If the link contains at least one DS1 trunk, the DS1 trunk is removed from the link, the switch is initialized for routing at block 196, initialized at block 198 and the program returns to block 136 to check routes In addition, if the link contains at least one DS3 trunk, it is removed from the link, and the aforementioned procedure is followed. When all links have been check for survivability, written reports are output at block 200.

While the best mode for carrying out the present invention has been described in detail, those familiar with the art to which this invention relates will recognize various alternative designs and embodiments for practicing the invention as defined by the following claims.

What is claimed is:

1. A computerized method for designing a frame relay network, the method comprising:

inputting data representing selected network parameters, the selected network parameters including network demand, central office information, and link information, the link information including a number of links and a type for each link, wherein the central office information includes a number of switches associated with a central office and a type for each switch, wherein the selected network parameters further include a trunk group in each switch, a backhaul link, a number of DS0 and DS1 access ports, and a number and type of permanent virtual connections (PVC), the data forming at least one data structure;

processing the data to determine a network capacity and whether the capacity is sufficient to meet network demand; and modifying the data representing the selected network parameters if the capacity is insufficient to meet network demand, wherein modifying the data includes upgrading the type of at least one link and the type of at least one switch;

wherein modifying the data further includes:
    if the number of DS0 or DS1 access ports demanded exceeds a number of DS0 or DS1 access cards in a switch in a central office, modifying the data structure by adding DS0 or DS1 access cards to empty DS0 or DS1 switch ports, respectively;
    if all switch ports are occupied and DS0 or DS1 access port demand has not been met at the central office, backhauling access port demand from one central office to another central office to the extent the another central office has excess capacity; and
    if unsatisfied demands at any central office cannot be backhauled to another central office, modifying said data structure by adding new switches and access cards at the central office to meet said unsatisfied demand at a minimal cost.

2. The method of claim 1 wherein modifying the data further includes increasing the number of links.

3. The method of claim 1 wherein modifying the data further includes increasing the number of switches.

4. The method of claim 1 wherein processing the data comprises:
    calculating the total access capacity and total PVC demand for each central office; and
    reporting if total access capacity is less than total PVC demand.

5. The method of claim 4 wherein modifying the data further comprises:
    identifying a least cost trunk path having a capacity sufficient to handle the PVC demand;
    modifying the data structure to update any unused capacity of the switches on the path and any unused bandwidth capacity of the links along the path;
    if a least cost trunk path cannot be identified, modifying the data structure to backhaul the PVC demand to another location.

6. The method of claim 5 wherein processing the data further comprises routing all unsatisfied PVC demand on the shortest paths without regard to capacity constraints to identify the path link with the largest amount of upgradable overflow.

7. A computerized method for designing a frame relay network, the method comprising:

inputting data representing selected network parameters, the selected network parameters including network demand, central office information, and link information, the link information including a number of links and a type for each link, wherein the central office information includes a number of switches associated with a central office and a type for each switch, wherein the selected network parameters further include a trunk group in each switch, a backhaul link, a number of DS0 and DS1 access ports, and a number and type of permanent virtual connections (PVC), the data forming at least one data structure;

processing the data to determine a network capacity and whether the capacity is sufficient to meet network demand, wherein processing the data includes calculating the total access capacity and total PVC demand for each central office and reporting if total access capacity is less than total PVC demand;

modifying the data representing the selected network parameters if the capacity is insufficient to meet network demand, wherein modifying the data includes upgrading the type of at least one link and the type of at least one switch and increasing the number of links and the number of switches;

identifying a least cost trunk path having a capacity sufficient to handle the PVC demand;

modifying the data structure to update any unused capacity of the switches on the path and any unused bandwidth capacity of the links along the path;

if a least cost trunk path cannot be identified, modifying the data structure to backhaul the PVC demand to another location;

routing all unsatisfied PVC demand on the shortest paths without regard to capacity constraints to identify the path link with the largest amount of upgradable overflow;

wherein modifying the data further includes:
  if the number of DS0 or DS1 access ports demanded exceeds a number of DS0 or DS1 access cards in a switch in a central office, modifying the data structure by adding DS0 or DS1 access cards to empty DS0 or DS1 switch ports, respectively;
  if all switch ports are occupied and DS0 or DS1 access port demand has not been met at the central office, backhauling access port demand from one central office to another central office to the extent the another central office has excess capacity; and
  if unsatisfied demands at any central office cannot be backhauled to another central office, modifying said data structure by adding new switches and access cards at the central office to meet said unsatisfied demand at a minimal cost.

8. The method of claim 7 further comprising:
when all demand is routed, checking the survivability of the network by removing a trunk from each link to initiate a failure; and
attempting to route the demand.

9. A computerized system for designing a frame relay network, the system comprising:
means for inputting data representing selected network parameters, the selected network parameters including network demand, central office information, and link information, the link information including a number of links and a type for each link, wherein the central office information includes a number of switches associated with a central office and a type for each switch, wherein the selected network parameters further include a trunk group in each switch, a backhaul link, a number of DS0 and DS1 access ports, and a number and type of permanent virtual connections (PVC), the data forming at least one data structure; and control logic operative to determine a network capacity and whether the capacity is sufficient to meet network demand, and modify the data representing the selected network parameters if the capacity is insufficient to meet network demand, wherein modification of the data includes upgrading the type of at least one link and the type of at least one switch;

wherein modification of the data further includes modifying the data structure by adding DS0 or DS1 access cards to empty DS0 or DS1 switch ports, respectively, if the number of DS0 or DS1 access ports demanded exceeds a number of DS0 or DS1 access cards in a switch in a central office, backhauling access port demand from one central office to another central office to the extent the another central office has excess capacity if all switch ports are occupied and DS0 or DS1 access port demand has not been met at the central office, and modifying said data structure by adding new switches and access cards at the central office to meet said unsatisfied demand at a minimal cost if unsatisfied demands at any central office cannot be backhauled to another central office.

10. The system of claim 9 wherein modification of the data further includes increasing the number of links.

11. The system of claim 9 wherein modification of the data further includes increasing the number of switches.

12. The system of claim 9 wherein the control logic, to determine a network capacity, is further operative to calculate the total access capacity and total PVC demand for each central office, and report if total access capacity is less than total PVC demand.

13. The system of claim 12 wherein modification of the data further includes identifying a least cost trunk path having a capacity sufficient to handle the PVC demand, modifying the data structure to update any unused capacity of the switches on the path and any unused bandwidth capacity of the links along the path, and, if a least cost trunk path cannot be identified, modifying the data structure to backhaul the PVC demand to another location.

14. The system of claim 13 wherein the control logic, to determine a network capacity and whether the capacity is sufficient to meet network demand, is further operative to route all unsatisfied PVC demand on the shortest paths without regard to capacity constraints to identify the path link with the largest amount of upgradable overflow.

15. A computerized system for designing a frame relay network, the system comprising:
means for inputting data representing selected network parameters, the selected network parameters including network demand, central office information, and link information, the link information including a number of links and a type for each link, wherein the central office information includes a number of switches associated with a central office and a type for each switch, wherein the selected network parameters further include a trunk group in each switch, a backhaul link, a number of DS0 and DS1 access ports, and a number and type of permanent virtual connections (PVC), the data forming at least one data structure;

control logic operative to determine a network capacity and whether the capacity is sufficient to meet network demand, and modify the data representing the selected network parameters if the capacity is insufficient to meet network demand, wherein modification of the data includes upgrading the type of at least one link and the type of at least one switch and increasing the number of links and the number of switches, wherein the control logic is further operative to calculate the total access capacity and total PVC demand for each central office, and report if total access capacity is less than total PVC demand, wherein modification of the data further includes identifying a least cost trunk path having a capacity sufficient to handle the PVC demand, modifying the data structure to update any unused capacity of the switches on the path and any unused bandwidth capacity of the links along the path, and, if a least cost trunk path cannot be identified, modifying the data structure to backhaul the PVC demand to another location, wherein the control logic is further operative to route all unsatisfied PVC demand on the shortest paths without regard to capacity constraints to identify the path link with the largest amount of upgradable overflow, wherein modification of the data further includes modifying the data structure by adding DS0 or DS1 access cards to empty DS0 or DS1 switch ports, respectively, if the number of DS0 or DS1 access ports demanded exceeds a number of DS0 or DS1 access cards in a switch in a central office, backhauling access port demand from one central office to another central office to the extent the another central office has excess capacity if all switch ports are occupied and DS0 or DS1 access port demand has not been met at the central office, and modifying said data structure by adding new switches and access cards at the central office to meet said unsatisfied demand at a minimal cost if unsatisfied demands at any central office cannot be backhauled to another central office.

16. The system of claim 15 wherein the control logic is further operative to check the survivability of the network when all demand is routed by removing a trunk from each link to initiate a failure and attempting to route the demand.

\* \* \* \* \*

UNITED STATES PATENT AND TRADEMARK OFFICE
CERTIFICATE OF CORRECTION

PATENT NO. : 5,940,373
DATED : August 17, 1999
INVENTOR(S) : Steve Y. Chiu; Subramanian Raghavan: Jiyang Xu; and ronald L. Hansen It is certified that error appears in the above-identified patent and that said Letters Patent is hereby corrected as shown below:

In Column 3, line 1: after "tool" insert --10--
In Column 6, line 26: after "block" delete --. --
In Column 7, line 4: after "each" delete --Co-- and insert --CO--
In Column 7, line 15: after "at" delecte --bleck-- and insert --block--

Signed and Sealed this

Seventh Day of March, 2000

Attest:

Q. TODD DICKINSON

Attesting Officer

Commissioner of Patents and Trademarks